United States Patent Office 2,849,517
Patented Aug. 26, 1958

2,849,517

PROCESS OF VULCANIZING RUBBER CONTAINING BIS - ALPHA - METHYLBENZYL - SUBSTITUTED PHENOL MONOSULFIDES AND RESULTING PRODUCTS

Harry E. Albert, Lafayette Hill, Pa., assignor to The Firestone Tire & Rubber Company, Akron, Ohio, a corporation of Ohio No Drawing. Continuation of application Serial No. 400,347, December 24, 1953. This application April 11, 1957, Serial No. 652,105

14 Claims. (Cl. 260—810)

This invention relates to antiozone agents which inhibit or prevent the deterioration of natural rubber by ozone.

These agents are bis-2,4-disubstituted phenol sulfides, one or both of the substituents being alpha-methylbenzyl groups. If only one substituent is an alpha-methylbenzyl substituent, the other is an alkyl, cycloalkyl, or aralkyl group containing up to nine carbon atoms. There can be two methyl groups on the alpha carbon of the benzyl substituent.

Oxygen and ozone both have a harmful effect on rubber, but the effect of each is different, and compounds which inhibit or prevent the harmful effect of one are not necessarily effective in stopping the harmful effect of the other.

Crabtree and Kemp in an article in Industrial and Engineering Chemistry, vol. 38, starting at page 278 (1946), explain the difference in the action of oxygen and ozone. The light-catalyzed oxidation which occurs during outdoor exposure forms a skin and crazed appearance over the exposed surface of the rubber. Ozone, even in very low concentration, attacks stretched rubber only (C. H. Leigh-Dugmore, Rubber Age and Synthetics, November and December 1952), and forms cracks perpendicular to the direction of stretch, and such cracking can occur in the absence of light.

As a matter of fact, practically all commercial rubber antioxidants are without effect in inhibiting deterioration caused by ozone. The alpha-methylbenzyl-substituted phenol monosulfides of this invention do not absorb or act directly on the ozone, but have some unknown action in preventing the cracking which is associated with ozone exposure in stretched natural rubber.

Natural rubber is used in the manufacture of the white-sidewalls of tires. The cracking of such sidewalls has long been a problem. It is often very extensive, and because of the color of the sidewall, it is very noticeable. It is a primary object of this invention to provide anti-ozone agents which prevent such cracking without discoloring the sidewall. However, the antiozone agents of this invention are not limited to that use but may be employed in black sidewalls, treads, thread and other latex products, and other rubber products.

Tires are stressed when inflated. While a tire is at rest it is stretched statically, and on a moving vehicle it is stretched dynamically. Some of the antiozone agents are more effective in static tests and others are more effective in dynamic tests. Antiozone agents effective under both conditions will be desired for tires, but for other rubber products an antiozone agent which does not meet both tests may be used.

The inhibitors of this invention include, for example:

Bis-2-alpha-methylbenzyl-4-methylphenol monosulfide
Bis-2-alpha-methylbenzyl-4-isopropylphenol monosulfide
Bis-2-alpha-methylbenzyl-4-sec.butylphenol monosulfide
Bis-2-alpha-methylbenzyl-4-t-butylphenol monosulfide
Bis-2-alpha-methylbenzyl-4-sec.amylphenol monosulfide
Bis-2-alpha-methylbenzyl-4-n-heptylphenol monosulfide
Bis-2-alpha-methylbenzyl-4-tt-octylphenol monosulfide
Bis-2-alpha, alpha-dimethylbenzyl-4-methylphenol monosulfide
Bis-2-methyl-4-alpha-methylbenzylphenol monosulfide
Bis-2-isopropyl-4-alpha-methylbenzylphenol monosulfide
Bis-2-sec.butyl-4-alpha-methylbenzylphenol monosulfide
Bis-2-t-butyl-4-alpha-methylbenzylphenol monosulfide
Bis-2-n-hexyl-4-alpha-methylbenzylphenol monosulfide
Bis-2-cyclohexyl-4-alpha-methylbenzylphenol monosulfide
Bis-2-tt-octyl-4-alpha-methylbenzylphenol monosulfide
Bis-2-ethyl-4-alpha, alpha-dimethylbenzylphenol monosulfide
Bis-2-cyclopentyl-4-alpha, alpha - dimethylbenzylphenol monosulfide
Bis-2,4-di-alpha-methylbenzylphenol monosulfide
Bis-2-alpha, alpha-dimethylbenzyl-4-alpha, alpha-dimethylbenzylphenol monosulfide The compounds of this invention containing a single methyl substituent in the alpha-carbon of the benzyl radical are preferably made by styrenating an alkylphenol, and then producing the sulfide. Those containing two methyl substituents are made by methylstyrenation. The monosulfides were prepared by reacting the disubstituted phenols with sulfur dichloride, using a solvent where desirable.

The following examples illustrate the preparation of the phenolsulfides.

EXAMPLE 1

One hundred and fifty grams (1 mole) of 4-t-butylphenol and 104 g. (1 mole) of styrene were used in this reaction. To a slurry prepared using one-fifth of each reactant there was added 1.5 g. conc. sulfuric acid, as catalyst. The remainder of the reactants were added over a period of 2 hours while the reacting mass was maintained at 50 to 60° C. The reaction mixture was allowed to stand overnight and the catalyst was removed by washing. On distillation 72.5 g. of 2-alpha-methylbenzyl-4-t-butylphenol, B. P. 180 to 185° C. at 5 mm., was obtained. A solution of 25.4 g. of this product in 100 ml. of n-hexane was allowed to react with 5.4 g. $SCl_2$ to give 26.3 grams of bis-2-alpha-methylbenzyl-4-t-butylphenol monosulfide, a viscous yellow liquid.

EXAMPLE 2

One mole each of 4-t-amylphenol and styrene were similarly reacted, using 8.0 g. conc. $H_2SO_4$. This yielded 66 g. of 2-alpha-methylbenzyl-4-t-amylphenol. B. P. 185 to 190° C. at 5 mm. A solution of 26.8 g. of this phenol in 100 ml. of n-hexane was treated with 5.4 g. of $SCl_2$ followed by removal of the solvent. This yielded 28.4 g. of bis-alpha-methylbenzyl-4-t-amylphenol monosulfide, a clear light yellow liquid.

EXAMPLE 3

One hundred sixty-two g. p-cresol (1.5 moles) and 20 g. $SnCl_4$, catalyst, were placed in a 500 ml. flask. One hundred fifty-six g. styrene (1.5 moles) were added with stirring over a one-hour period at 65 to 70° C. After heating the reaction mixture 3 hours at 65 to 70° C., it was washed with dilute hydrochloric acid (100 ml. conc. HCl plus 300 ml. water), 200 ml. 5% NaOH, and finally with water. The product was vacuum distilled. The yield was 152 g. of alpha-methylbenzyl-4-methylphenol boiling at 180 to 185° C. at 10 mm. Sulfur dichloride (6.4 g.) was added to a solution of this phenol in 100 ml. of n-hexane. Removal of solvent gave 24.1 g. of bis-2-alpha-methylbenzyl-4-methylphenol monosulfide, a viscous, sticky turbid liquid.

EXAMPLE 4

Ninety-three grams of 4-alpha-methylbenzylphenol, obtained by styrenating phenol, was reacted with 56 g. diisobutylene in the presence of 5 g. of conc. $H_2SO_4$ at 30 to 35° C. for 4 hours. This yielded 99.5 g. of 2-tt-octyl-4-alpha-methylbenzyl phenol. B. P. was 180 to 185° C. at 10 mm. Reacting 25 g. of this with 4.4 g. $SCl_2$, in a solvent such as hexane, bis-2-tt-octyl-4-alpha-methylbenzylphenol monosulfide is obtained as a viscous yellow liquid.

EXAMPLE 5

For the preparation of 2,4-di-alpha-methylbenzylphenol, 94 g. phenol (1 mole) and 38 g. conc. $H_2SO_4$ were placed in 500 ml. flask. Then 208 g. styrene were introduced with stirring during 1 hr. 55 min. at 25 to 27° C. The reaction mixture was stirred at 25° C. for 2 hrs. after adding 1.9 g. additional conc. sulfuric acid. One hundred ml. of water were added and the mixture was stirred while heating on the steam bath to 75 to 80° C. The aqueous layer was removed in a separatory funnel after addition of petroleum ether to facilitate separation. The petroleum ether was removed on a steam bath and the residue was distilled under reduced pressure. The 2,4-dialpha-methylbenzylphenol, a colorless liquid, was taken at 190 to 200° C. at 1 mm. It weighed 129.5 g. By reacting 25 g. of 2,4-di-alpha-methylbenzylphenol with 4.5 g. $SCl_2$ in the absence of solvent, 25.1 g. of bis-2,4-di-alpha-methylbenzylphenol monosulfide was obtained as a viscous, yellow liquid.

The inhibiting effect of the antiozone agents in rubber was determined by treatment of unaged, cured stocks with air of controlled low ozone content in specially designed equipment and also by outdoor exposure to natural weathering. The tests were conducted with one-half inch dumbbell samples of approximately 100 gauge thickness. The special apparatus for testing with air of controlled low ozone content and the method of testing therein are described in the articles by Ford and Cooper, appearing in India Rubber World for September and October 1951, entitled "A Study of the Factors Affecting the Weathering of Rubber-like Materials—I and II." The following reports of such tests give the ozone concentration maintained during each test in parts per 100,000,000 parts of air, the duration of the test, and the temperature used. Two types of tests were conducted. In one type—called the dynamic test—the sample was repeatedly stretched between the limits of 0 and 20 percent elongation at the rate of 108 cycles per minute. In the other type of test—the static test—the samples were stretched 12.5 percent and maintained at that elongation throughout the test. No special lights were used in either test. On completion of each test, the size of the cracks in each sample was compared visually with the size of the cracks in a blank which contained no antiozone agent and which was cured and tested at the same time as the test sample. The size was determined according to an arbitrary scale of measuring, using the numerals 0, 1, 2, 3, 4 and 5 to represent no visual cracking and cracks which were very fine, fine, medium, coarse, and very coarse, respectively.

The reported results include data on the tensile properties of the cured rubber stocks before and after aging 2 days in an oven at 212° F. The modulus and tensile strength are given in pounds per square inch and the elongation is reported as percent of stretch at the break. These data are included to show that the antiozone agents have no substantial deleterious effect on the cure or upon the aging of the cured stocks.

The antiozone agents were tested in white stock such as might be used in white sidewalls for tires, and also in stock such as that which might be used in tire treads. The blanks of the white stock were compounded according to the following formula:

| | Parts by weight |
|---|---|
| Natural rubber | 100 |
| White pigment and filler | 90.2 |
| Stearic acid | 1.2 |
| Sulfur | 3.0 |
| Accelerator | 0.9 |

All blanks and test samples of white stock were cured 60 minutes at 280° F.

The blanks used for testing the effect of the antiozone agents in tread stock were compounded according to the following formula:

| | Parts by weight |
|---|---|
| Natural rubber | 100 |
| Sulfur | 2.2 |
| Carbon black | 45 |
| Pine tar | 2.0 |
| Stearic acid | 2.0 |
| Accelerator | 1.0 |
| Zinc oxide | 3.0 |

All blanks and test samples of tread stock were cured 45 minutes at 280° F.

In all of the test samples, both those tested in the special apparatus and those subjected to natural outdoor weathering, 2.0 parts by weight of the antiozone agent was added to the blank formula for each 100 parts by weight of the rubber present. Any relatively small amount can be employed, and this can vary, for example, from 0.2 part by weight to 10 parts by weight, depending upon the use to be made of the rubber composition.

The following tables record the properties of white stocks and tread stocks containing inhibitors of this invention and show that the inhibitors have no substantial effect on the vulcanization or aging of the rubber, and give the results of testing the various unaged cured stocks with ozone in the special apparatus described previously.

*Table 1.—White stock*

| | | | |
|---|---|---|---|
| Blank | 195.3 | 195.3 | 195.3 |
| Bis-2-alpha-methylbenzyl-4-methylphenol monosulfide | | 2 | |
| Bis-2-alpha-methylbenzyl-4-t-amylphenol monosulfide | | | 2 |
| Normal tensile properties: | | | |
| 400% modulus | 925 | 850 | 825 |
| Tensile strength | 3,600 | 3,350 | 3,350 |
| Elongation at break | 635 | 630 | 630 |
| Aged 2 days in oven at 212° F.: | | | |
| 400% modulus | 375 | 725 | 675 |
| Tensile strength | 625 | 2,000 | 1,750 |
| Elongation at break | 480 | 590 | 570 |
| Ozone effects (7 hrs. at 60 p. p. h. m. and 95 F.): | | | |
| Static | 4+ | 1− | 2− |
| Dynamic | 4+ | 1− | 1− |

*Table 2.—White stock*

| | | |
|---|---|---|
| Blank | 195.3 | 195.3 |
| Bis-2-alpha-methylbenzyl-4-sec.amylphenol monosulfide | | 2 |
| Normal tensile properties: | | |
| 400% modulus | 925 | 875 |
| Tensile strength | 3,625 | 3,465 |
| Elongation at break | 625 | 605 |
| Aged 2 days in oven at 212° F.: | | |
| 400% modulus | 900 | 1,000 |
| Tensile strength | 2,150 | 2,100 |
| Elongation at break | 545 | 530 |
| Ozone effects (7 hrs. at 60 p. p. h. m. and 95° F.): | | |
| Static | 4 | 0+ |
| Dynamic | 4− | 0+ |

Table 3.—White stock

| | | |
|---|---|---|
| Blank | 195.3 | 195.3 |
| Bis-2-tt-octyl-4-alpha-methylbenzyl-phenol monosulfide | | 2 |
| Normal tensile properties: | | |
|   400% modulus | 925 | 825 |
|   Tensile strength | 3,600 | 3,325 |
|   Elongation at break | 635 | 630 |
| Aged 2 days in oven at 212° F.: | | |
|   400% modulus | 375 | 750 |
|   Tensile strength | 625 | 1,875 |
|   Elongation at break | 480 | 555 |
| Ozone effects (7 hrs. at 60 p. p. h. m. and 95° F.): | | |
|   Static | 4+ | 2− |
|   Dynamic | 4+ | 1 |

Table 4.—White stock

| | | |
|---|---|---|
| Blank | 195.3 | 195.3 |
| Bis-2-methyl-4-alpha-methylbenzylphenol monosulfide | | 2 |
| Normal tensile properties: | | |
|   400% modulus | 925 | 800 |
|   Tensile strength | 3,625 | 3,425 |
|   Elongation at break | 625 | 635 |
| Aged 2 days in oven at 212° F.: | | |
|   400% modulus | 900 | 925 |
|   Tensile strength | 2,150 | 2,225 |
|   Elongation at break | 545 | 545 |
| Ozone effects (7 hrs. at 60 p. p. h. m. and 95° F.): | | |
|   Static | 4 | 0 |
|   Dynamic | 4− | 0+ |

Table 5.—Tread stock

| | | |
|---|---|---|
| Blank | 155.2 | 155.2 |
| Bis-2-alpha-methylbenzyl-4-methylphenol monosulfide | | 2 |
| Normal tensile properties: | | |
|   400% modulus | 2,750 | 2,500 |
|   Tensile strength | 4,275 | 4,250 |
|   Elongation at break | 525 | 545 |
| Aged 2 days in oven at 212° F.: | | |
|   400% modulus | | 2,525 |
|   Tensile strength | 2,300 | 2,650 |
|   Elongation at break | 360 | 415 |
| Ozone effects (14 hrs. at 25 p. p. h. m. and room temperature): | | |
|   Static | 3− | 0 |
|   Dynamic | 3 | 0 |

Table 6.—Tread stock

| | | | |
|---|---|---|---|
| Blank | 155.2 | 155.2 | 155.2 |
| Bis-2-alpha-methylbenzyl-4-t-butylphenol monosulfide | | 2 | |
| Bis-2-alpha-methylbenzyl-4-t-amylphenol monosulfide | | | 2 |
| Normal tensile properties: | | | |
|   400% modulus | 2,700 | 2,500 | 2,425 |
|   Tensile strength | 4,350 | 4,200 | 4,275 |
|   Elongation at break | 535 | 540 | 540 |
| Aged 2 days in oven at 212° F.: | | | |
|   400% modulus | | | |
|   Tensile strength | 1,450 | 1,850 | 1,950 |
|   Elongation at break | 295 | 350 | 375 |
| Ozone effects (14 hrs. at 25 p. p. h. m. and room temperature): | | | |
|   Static | 2 | 1− | 0 |
|   Dynamic | 1+ | 1− | 1− |

Table 7.—Tread stock

| | | |
|---|---|---|
| Blank | 155.2 | 155.2 |
| Bis-2-tt-octyl-4-alpha-methylbenzylphenol monosulfide | | 2 |
| Normal tensile properties: | | |
|   400% modulus | 2,650 | 2,500 |
|   Tensile strength | 4,200 | 4,050 |
|   Elongation at break | 525 | 535 |
| Aged 2 days in oven at 212° F.: | | |
|   400% modulus | | 2,460 |
|   Tensile strength | 2,250 | 2,475 |
|   Elongation at break | 355 | 405 |
| Ozone effects (14 hrs. at 25 p. p. h. m. and room temperature): | | |
|   Static | 3+ | 1− |
|   Dynamic | 3 | 1− |

Table 8.—Tread stock

| | | |
|---|---|---|
| Blank | 155.2 | 155.2 |
| Bis-2,4-di-alpha-methylbenzylphenol monosulfide | | 2 |
| Cured 45 min. at 280° F. | | |
| Normal tensile properties: | | |
|   400% modulus | 2,750 | 2,425 |
|   Tensile strength | 4,275 | 4,275 |
|   Elongation at break | 525 | 560 |
| Aged 2 days in oven at 212° F.: | | |
|   400% modulus | | 2,640 |
|   Tensile strength | 2,300 | 2,715 |
|   Elongation at break | 360 | 410 |
| Ozone effects (14 hrs. at 25 p. p. h. m. and room temperature): | | |
|   Static | 3− | 1+ |
|   Dynamic | 3 | 0+ |

The foregoing results show the inhibiting effect of the antiozone agents of this invention, and that they have no substantial effect on the vulcanization of the rubber or no deleterious effect on the aging of the vulcanizate. The following tables show the effect of the inhibitors in white and tread stocks exposed to natural weathering.

Table 9.—Evaluation of white stocks after outdoor aging

| | After 30 days | | |
|---|---|---|---|
| | Front | Back | Edge |
| Blank | 5− | 2− | 5− |
| Bis-2-alpha-methylbenzyl-4-methylphenol monosulfide | 4− | 1+ | 3 |
| Bis-2-alpha-methylbenzyl-4-t-amylphenol monosulfide | 3+ | 1+ | 3+ |

Table 10.—Evaluation of white stocks after outdoor exposure

| | After 20 days | | |
|---|---|---|---|
| | Front | Back | Edge |
| Blank | 4 | 1+ | 4 |
| Bis-2-alpha-methylbenzyl-4-sec. amylphenol monosulfide | 2 | 1 | 3 |

Table 11.—Evaluation of white stocks after outdoor exposure

| | After 30 days | | |
|---|---|---|---|
| | Front | Back | Edge |
| Blank | 5− | 2− | 5− |
| Bis-2-tt-octyl-4-alpha-methylbenzylphenol monosulfide | 3+ | 1+ | 3 |

Table 12.—Evaluation of white stocks after outdoor exposure

| | After 30 days | | |
|---|---|---|---|
| | Front | Back | Edge |
| Blank | 4 | 1+ | 4 |
| Bis-2-methyl-4-alpha-methylbenzylphenol monosulfide | 2+ | 1 | 2 |

Table 13.—Evaluation of tread stocks after outdoor exposure

| | After 30 days | |
|---|---|---|
| | Front | Back |
| Blank | 2− | 2− |
| Bis-2-alpha-methylbenzyl-4-t-amylphenol monosulfide | 1− | 1− |
| Bis-2-alpha-methylbenzyl-4-t-butylphenol monosulfide | 1 | 1 |

*Table 14.—Evaluation of tread stocks after outdoor exposure*

|  | After 30 days ||
|---|---|---|
|  | Front | Back |
| Blank | 2 | 1+ |
| Bis-2-alpha-methylbenzyl-4-methylphenol monosulfide | 1– | 1– |

*Table 15.—Evaluation of tread stocks after outdoor exposure*

|  | After 30 days ||
|---|---|---|
|  | Front | Back |
| Blank | 2– | 2 |
| Bis-2-tt-octyl-4-alpha-methylbenzylphenol monosulfide | 1– | 1– |

*Table 16.—Evaluation of tread stocks after outdoor exposure*

|  | After 30 days ||
|---|---|---|
|  | Front | Back |
| Blank | 2 | 1+ |
| Bis-2,4-di-alpha-methylbenzylphenol monosulfide | 1+ | 1– |

The recorded results are illustrative. The antiozone agents can be used in rubber compositions compounded for use in tires and for latex compositions compounded for use in rubber thread and in other rubber stocks.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. N-cyclohexyl-2-bonzothiazolesulfenamide, thiazoline sulfenamides, thiocarbamyl sulfenamides, mercaptothiazoles, mercaptothiazolines, thiazolyl mono- and di-sulfides, the N,N-dialkyl-dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulation, especially such common accelerators as piperidinium penetamethylenedithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

This application is a continuation-in-part of my application S. N. 400,346, now abandoned, and a continuation of application S. N. 400,347 of Lloyd O. Bentz and myself, now abandoned.

What I claim is:

1. A sulfur-vulcanized composition of natural rubber which contains a small amount of bis-2,4-disubstituted phenol monosulfide in which one substituent is an alpha-methylbenzyl group and the other substituent is from the class consisting of alkyl, cycloalkyl and aralkyl groups containing up to nine carbon atoms.

2. A sulphur-vulcanized composition of natural rubber which contains a small amount of a bis-2-alpha-methylbenzyl-4-amylphenol monosulfide.

3. A sulfur-vulcanized composition of natural rubber which contains a small amount of bis-2-alpha-methylbenzyl-4-methylphenol monosulfide.

4. The process of sulfur-vulcanizing a natural rubber composition which comprises vulcanizing such composition in the presence of a small amount of a bis-2-alpha-methylbenzyl-4-amylphenol monosulfide.

5. The process of sulfur-vulcanizing a natural rubber composition which comprises vulcanizing such composition in the presence of a small amount of bis-2-alpha methylbenzyl-4-methylphenol monosulfide.

6. A sulfur-vulcanized composition of natural rubber which contains a small amount of a bis-2-substituted-4-alphamethylbenzylphenol monosulfiide in which the 2-substituent is from the class consisting of alkyl, cycloalkyl and aralkyl groups which contain up to nine carbon atoms.

7. A sulfur-vulcanized composition of natural rubber which contains a small amount of bis-2-methyl-4-alpha-methylbenzylphenol monosulfide.

8. A sulfur-vulcanized composition of natural rubber which contains a small amount of a bis-2-octyl-4-alpha-methylbenzylphenol monosulfide.

9. A sulfur-vulcanized composition of natural rubber which contains a small amount of bis(2,4-di-alpha-methylbenzylphenol)monosulfide.

10. The method of sulfur-vulcanizing a natural rubber composition which comprises vulcanizing such a composition in the presence of a small amount of a bis-2,4-disubstituted phenol monosulfide in which one substituent is an alpha-methylbenzyl group and the other substituent is from the class consisting of alkyl, cycloalkyl and aralkyl groups which contain up to nine carbon atoms.

11. The method of sulfur-vulcanizing a natural rubber composition which comprises vulcanizing such a composition in the presence of a small amount of bis-2-methyl-4-alpha-methylbenzylphenol monosulfide.

12. The method of sulfur-vulcanizing a natural rubber composition which comprises vulcanizing such a composition in the presence of a small amount of a bis-2-octyl-4-alpha-methylbenzylphenol monosulfide.

13. The method of sulfur-vulcanizing a natural rubber composition which comprises vulcanizing such a composition in the presence of a small amount of bis-2,4-di-alpha-methylbenzylphenol monosulfide.

14. The process of sulfur-vulcanizing a natural rubber composition which comprises vulcanizing such composition in the presence of a small amount of a bis-2,4-disubstituted phenol monosulfide in which one substituent is an alpho-methylbenzyl group and the other substituent is from the class consisting of alpha-methylbenzyl, alkyl, cycloalkyl and aralkyl groups containing up to nine carbon atoms.

No references cited.

UNITED STATES PATENT OFFICE

CERTIFICATE OF CORRECTION

Patent No. 2,849,517                        August 26, 1958

Harry E. Albert

It is hereby certified that error appears in the above numbered patent requiring correction and that the said Letters Patent should read as corrected below.

In the heading to the printed specification, line 1, in the title of invention, for "PORCESS" read -- PROCESS --; column 3, line 16, after "in" insert -- a --; column 4, Table 1, first column thereof, third line from the bottom, for "95 F." read -- 95° F. --; column 7, line 49, for "2-bonzo-thiazolesulfen-" read -- 2-benzothiazolesulfen- --; column 8, line 9, for "stelf," read -- self, --; line 17 for "sulphur-vulcanized" read -- sulfur-vulcanized --; line 33, for "alphamethylbenzylphenol monosulfiide" read -- alpha-methylbenzylphenol monosulfide --; line 68, for "alpho-" read -- alpha- --.

Signed and sealed this 27th day of September 1960.

(SEAL)
Attest:

KARL H. AXLINE

Attesting Officer

ROBERT C. WATSON
Commissioner of Patents